United States Patent
Yan et al.

(10) Patent No.: US 9,591,120 B2
(45) Date of Patent: Mar. 7, 2017

(54) METHOD AND DEVICE FOR ADDING APPLICATION BADGE

(71) Applicant: Xiaomi Inc., Beijing (CN)

(72) Inventors: Zheng Yan, Beijing (CN); Ying Wang, Beijing (CN); Shaoping Zhu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/698,963

(22) Filed: Apr. 29, 2015

(65) Prior Publication Data

US 2016/0050307 A1    Feb. 18, 2016

Related U.S. Application Data

(63) Continuation of application No. PCT/CN2015/071293, filed on Jan. 22, 2015.

(30) Foreign Application Priority Data

Aug. 15, 2014 (CN) .......................... 2014 1 0401486

(51) Int. Cl.
*H04M 1/00* (2006.01)
*H04M 1/725* (2006.01)
(Continued)

(52) U.S. Cl.
CPC ...... *H04M 1/72552* (2013.01); *H04L 12/587* (2013.01); *H04L 51/24* (2013.01);
(Continued)

(58) Field of Classification Search
CPC ....... H04W 4/12; H04W 4/14; H04W 68/005; H04M 1/72552; H04M 2250/60;
(Continued)

(56) References Cited

U.S. PATENT DOCUMENTS 8,723,823 B2 * 5/2014 Shia ....................... G06Q 10/10
345/173
2008/0098331 A1    4/2008 Novick et al.
(Continued)

FOREIGN PATENT DOCUMENTS

| CN | 102004603 A | 4/2011 |
|---|---|---|
| CN | 103155510 A | 6/2013 |

(Continued)

OTHER PUBLICATIONS

International Search Report of International Patent Application No. PCT/CN2015/071293, from the State Intellectual Property Office of China, mailed Mar. 27, 2015 (5 pages).
(Continued)

*Primary Examiner* — Olumide T Ajibade Akonai
(74) *Attorney, Agent, or Firm* — Finnegan, Henderson, Farabow, Garrett & Dunner LLP

(57) ABSTRACT

A method for adding an application badge includes detecting whether a notification bar receives a notification message. The notification message is sent by an application to the notification bar after receiving an unread message. The method further includes determining the number of unread messages received by the application according to the notification message if the notification bar receives a notification message, and updating an icon of the application to display a badge value according to the number of unread messages.

12 Claims, 10 Drawing Sheets

(51) Int. Cl.
*H04W 4/12* (2009.01)
*H04W 68/00* (2009.01)
*H04L 12/58* (2006.01)
*G06F 3/0481* (2013.01)
*G06Q 10/10* (2012.01)

(52) U.S. Cl.
CPC ........... *H04W 4/12* (2013.01); *H04W 68/005* (2013.01); *G06F 3/04817* (2013.01); *G06Q 10/107* (2013.01); *H04L 51/38* (2013.01)

(58) Field of Classification Search
CPC ............. H04M 3/537; H04M 1/72522; H04M 1/72583; H04M 1/72569; G06F 3/04817; G06F 3/0485; G06F 3/04855; H04L 12/587; H04L 51/04; H04L 51/24; H04L 51/38
USPC ...... 455/412.1, 412.2, 566, 414.1, 567, 415, 455/466; 715/830, 835, 747, 763, 765
See application file for complete search history.

(56) References Cited

U.S. PATENT DOCUMENTS

| | | |
|---|---|---|
| 2010/0223569 A1 | 9/2010 | Vuong et al. |
| 2011/0269506 A1 | 11/2011 | Choi et al. |
| 2012/0223569 A1 | 9/2012 | Lust |
| 2012/0317498 A1 | 12/2012 | Logan et al. |
| 2013/0007665 A1 | 1/2013 | Chaudhri et al. |
| 2013/0145448 A1* | 6/2013 | Newell ................... G06F 21/31 726/7 |
| 2014/0038561 A1 | 2/2014 | Wang et al. |
| 2014/0256295 A1 | 9/2014 | Peng et al. |
| 2015/0058789 A1* | 2/2015 | Namgung ............. G06F 3/0488 715/781 |
| 2015/0169159 A1 | 6/2015 | Yang |

FOREIGN PATENT DOCUMENTS

| | | |
|---|---|---|
| CN | 103297932 A | 9/2013 |
| CN | 103309618 A | 9/2013 |
| CN | 103472975 A | 12/2013 |
| CN | 103543952 A | 1/2014 |
| CN | 103582873 A | 2/2014 |
| CN | 103634199 A | 3/2014 |
| CN | 103677575 A | 3/2014 |
| CN | 103853433 A | 6/2014 |
| CN | 104238875 A | 12/2014 |
| JP | 2007512635 A | 5/2007 |
| KR | 10-2006-0105806 | 10/2006 |
| KR | 10-2014-0032634 | 3/2014 |
| KR | 10-2014-0095712 | 8/2014 |
| RU | 2383919 C2 | 3/2010 |
| WO | WO 2013/075575 A1 | 5/2013 |
| WO | WO 2014/019466 A1 | 2/2014 |
| WO | WO 2014/101376 A1 | 7/2014 |

OTHER PUBLICATIONS

European Search Report of European Patent Application No. EP 15 17 9507, mailed Oct. 28, 2015, issued by the European Patent Office (6 pages).

Notification Regarding Results of Examination on Patentability for Russian Patent Application No. 2015112967, mailed May 31, 2016, issued by the Russian Patent Office (14 pages including translation).

English translation of International Search Report of International Application No. PCT/CN2015/071293 dated Mar. 27, 2015 (2 pages).

* cited by examiner

METHOD AND DEVICE FOR ADDING APPLICATION BADGE

CROSS-REFERENCE TO RELATED APPLICATIONS

This application is a Continuation Application of International Application No. PCT/CN2015/071293, filed on Jan. 22, 2015, which is based on and claims priority to Chinese Patent Application No. 201410401486.X, filed on Aug. 15, 2014, the entire contents of both of which are incorporated herein by reference.

TECHNICAL FIELD

The present disclosure relates to computer technology and, more particularly, to a method for adding an application badge and a device thereof.

BACKGROUND

Generally, for an application (App) installed on a smart mobile phone, an icon of the application is added to the desktop of the smart mobile phone. Sometimes a badge can be added to the icon to indicate that there are unread messages in the application. Conventionally, the operation system of a smart mobile phone monitors unread messages of system applications, and obtain the number of unread messages for each system application. The operation system then uses the number of unread messages as a badge value of the system application, and adds the badge value to the icon of the system application.

SUMMARY

In accordance with the present disclosure, there is provided a method for adding an application badge. The method includes detecting whether a notification bar receives a notification message. The notification message is sent by an application to the notification bar after receiving an unread message. The method further includes determining the number of unread messages received by the application according to the notification message if the notification bar receives a notification message, and updating an icon of the application to display a badge value according to the number of unread messages.

Also in accordance with the present disclosure, there is provided a device for adding an application badge. The device includes a processor and a non-transitory computer-readable storage medium storing instructions. The instructions, when executed by the processor, cause the processor to detect whether a notification bar receives a notification message. The notification message is sent by an application to the notification bar after receiving an unread message. The instructions further cause the processor to determine the number of unread messages received by the application according to the notification message if the notification bar receives a notification message, and update an icon of the application to display a badge value according to the number of unread messages.

Also in accordance with the present disclosure, there is provided a non-transitory computer-readable storage medium storing instructions. The instructions, when executed by a processor of an electronic device, cause the electronic device to detect whether a notification bar receives a notification message. The notification message is sent by an application to the notification bar after receiving an unread message. The instructions further cause the electronic device to determine the number of unread messages received by the application according to the notification message if the notification bar receives a notification message, and update an icon of the application to display a badge value according to the number of unread messages.

It will be appreciated that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DESCRIPTION OF THE EMBODIMENTS

Figure 1:
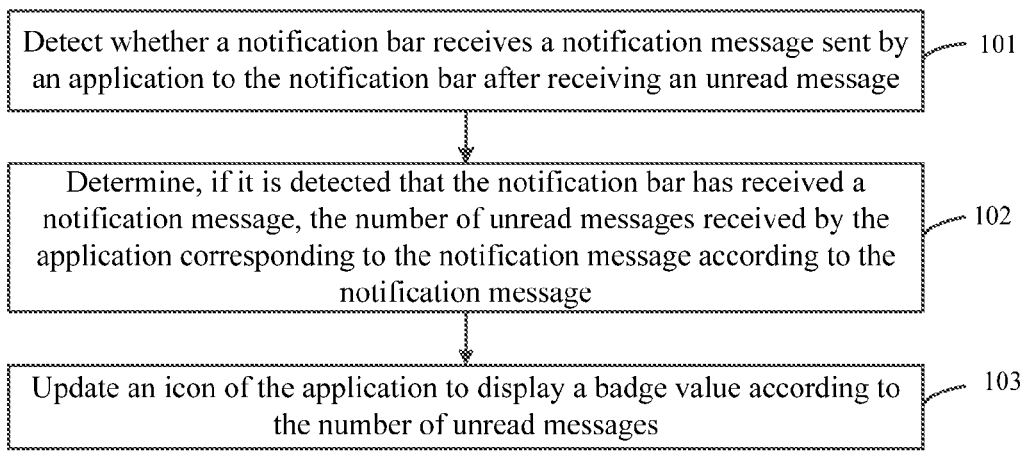
FIG. 1 is a flow chart showing a method for adding an application badge according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. Methods consistent with the present disclosure can be implemented in an electronic device, such as a smart mobile phone, a tablet computer, a smart television, an e-book reader, a laptop computer, a desktop computer, or the like FIG. 1 is a flow chart showing an exemplary method for adding an application badge consistent with embodiments of the disclosure. As shown in FIG. 1, at 101, whether a notification bar receives a notification message is detected. The notification message is sent by an application to the notification bar after the application receives an unread message. The application may be a system application originally installed in the electronic device, or a non-system application installed by users.

In some embodiments, the notification bar is arranged on one side, such as the upper side or the left side, of the screen of the electronic device. The notification bar is used to display a prompt message (e.g., a notification message, etc.) indicating new messages exist in various applications of the electronic device. When the electronic device is not in a full-screen status, the notification bar may be always displayed on one side of the screen of the electronic device, not affected by display interfaces of other running applications.

In order to notify the user of an unread message, the application generally sends a notification message to the notification bar of the electronic device after receiving the unread message.

At 102, if it is detected that the notification bar has received a notification message, the number of unread messages received by the application corresponding to the notification message is determined according to the notification message. In some embodiments, the notification message carries an application identifier, and thus the application from which the notification message is sent can be determined according to the application identifier in the notification message.

At 103, an icon of the application is updated to display a badge value according to the number of unread messages.

According to the present disclosure, an application may be a specific application or an unspecific application. A specific application accumulates unread messages during a statistical time range and sends a notification message to the notification bar after the statistical time range. On the other hand, an unspecific application sends a notification message to the notification bar every time it receives an unread message. Therefore, a notification message sent by a specific application may correspond to at least one unread message, such as one, two, or more unread messages, while a notification message sent by an unspecific application usually corresponds to only one unread message.

In some embodiments, the statistical time range may be a time range corresponding to a predefined time interval. The specific application adds up unread messages received at the predefined time interval, generates a notification message according to these unread messages, and sends the notification message to the notification bar. That is, the number of unread messages corresponding to the notification message equals that of unread messages actually received by the specific application within the statistical time range. For example, if the number of unread messages acquired within the statistical time range is one (1), then the number of unread messages corresponding to the notification message is also one (1). If the number of unread messages acquired within the statistical time range is two (2) or more, then the number of unread messages corresponding to the notification message is also two (2) or more.

Since unspecific applications and specific applications use different approaches when sending notification messages, the methods for determining the number of unread messages received by corresponding applications according to notification messages received by the notification bar are also different for unspecific applications and specific applications.

Figure 2A:
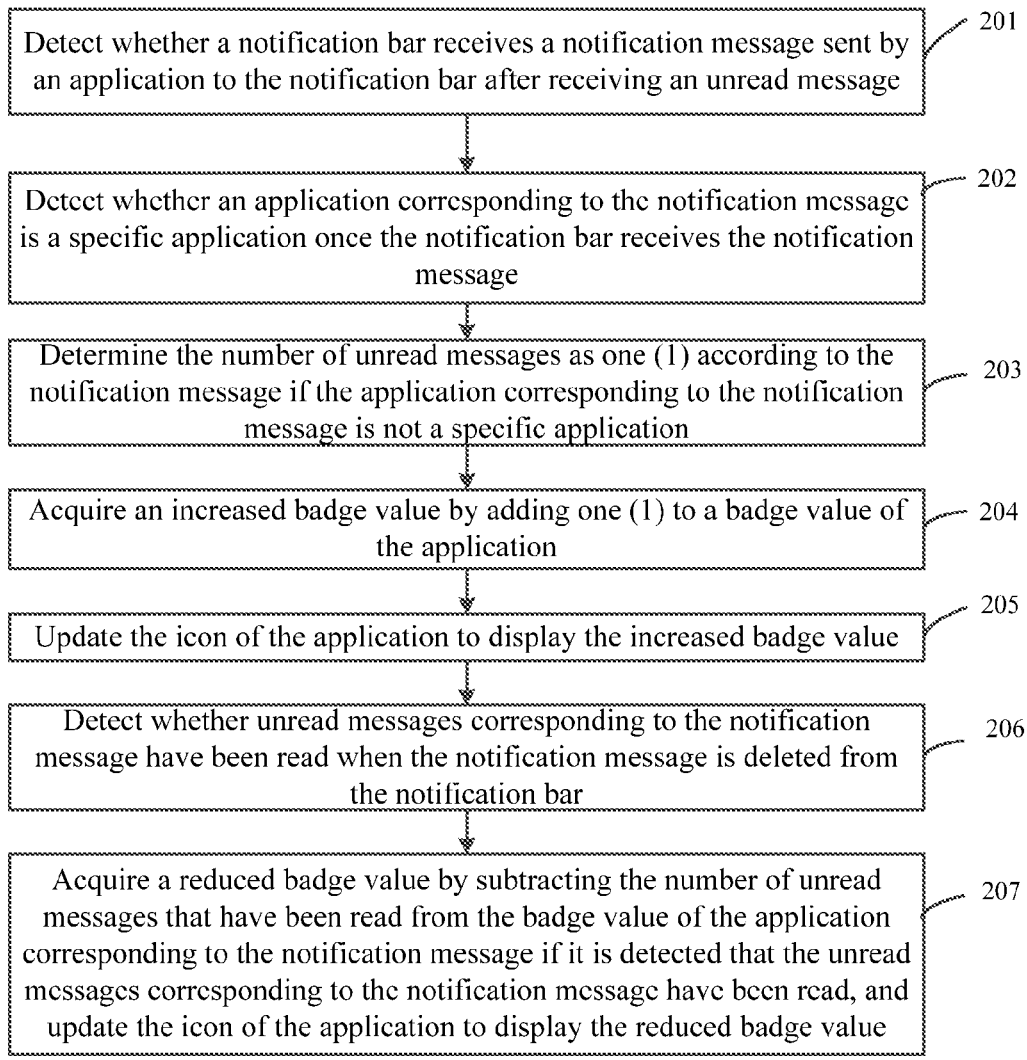
FIG. 2A is a flow chart showing a method for adding an application badge according to another exemplary embodiment.

FIG. 2A is a flow chart showing an exemplary method for adding an application badge consistent with embodiments of the disclosure. As shown in FIG. 2A, at 201, whether a notification bar receives a notification message is detected. The notification message is sent by an application to the notification bar after the application receives an unread message. The application may be a system application originally installed in the electronic device, or a non-system application installed by users.

Figure 2B:
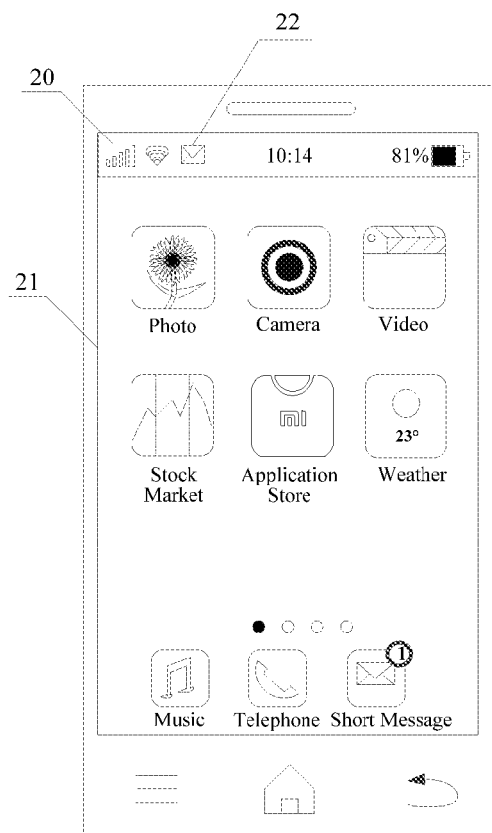
FIG. 2B shows an interface displaying a notification bar according to an exemplary embodiment.

FIG. 2B shows an interface displaying a notification bar 20 in a screen 21 of an electronic device, according to an exemplary embodiment. In FIG. 2B, the notification bar 20 is arranged on the top of the screen 21. The notification bar 20 displays a notification message 22 of a short message.

Referring again to FIG. 2A, at 202, whether an application corresponding to the notification message is a specific application is detected once the notification bar receives the notification message. In some embodiments, the notification message carries an application identifier, and thus the application from which the notification message is sent can be determined according to the application identifier in the notification message.

In some embodiments, specific applications may be stored, for example, in a table. When it is needed to detect whether an application is a specific application, it is only needed to detect whether the application is a specific application stored. If so, the application is a specific application.

Figure 2C:
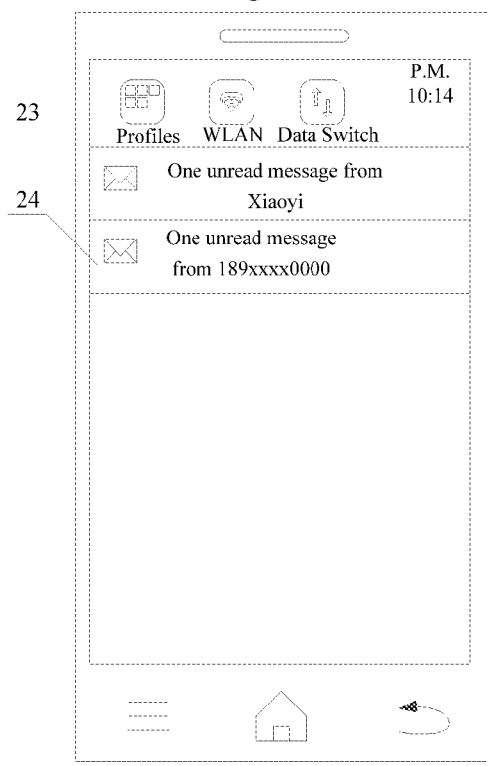
FIG. 2C shows an interface displaying a notification message corresponding to an unspecific application in a notification bar according to an exemplary embodiment.

In some embodiments, contents of the notification messages can be shown by pulling down the notification bar. The same unspecific application may correspond to a plurality of notification messages, each indicating that the unspecific application has an unread message. For example, FIG. 2C shows an interface displaying a notification message corresponding to an unspecific application in the notification bar according to an exemplary embodiment. In FIG. 2C, both notification message 23 and notification message 24 correspond to an unspecific application, Short Message. The notification message 23 indicates that the application, Short Message, has an unread message sent by Xiaoyi and the notification message 24 indicates that the application, Short Message, has an unread message sent by a number 189XXXX0000.

Figure 2D:
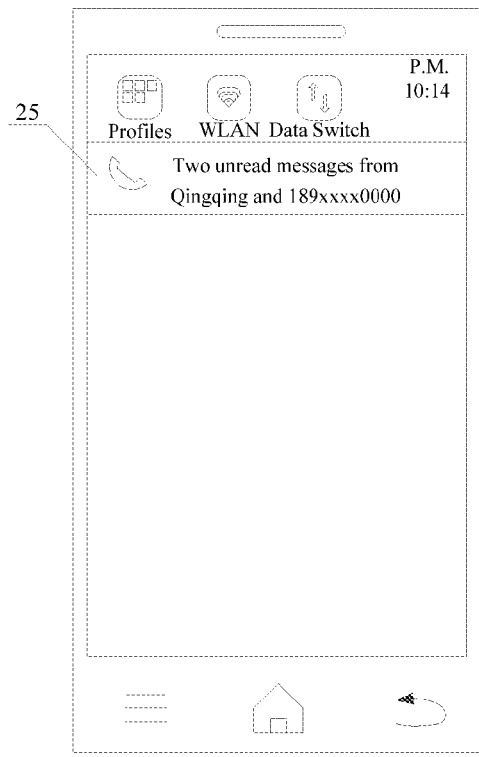
FIG. 2D shows an interface displaying a notification message corresponding to a specific application in a notification bar according to an exemplary embodiment.

The same specific application may correspond to only one notification message indicating that the specific application has one or more unread messages. For example, FIG. 2D shows an interface displaying a notification message corresponding to a specific application in a notification bar according to an exemplary embodiment. In FIG. 2D, notification message 25 corresponds to a specific application—

Incoming Call. The notification message 25 indicates that the application Incoming Call has two missed calls, one from Qingqing, and the other one from a number 189XXXX0000.

Referring again to FIG. 2A, at 203, if the application corresponding to the notification message is not a specific application, then the number of unread messages is determined as one (1) according to the notification message. That is, if the application corresponding to the notification message is not a specific application, then the application is an unspecific application, which sends a notification message to the notification bar every time it receives an unread message, i.e., each notification message from that application corresponds to one unread message. In this scenario, the number of unread messages that can be determined by the notification message is one (1).

At 204, a badge value of the application is increased by one (1). If an application originally did not have unread messages, by default the application had a badge value of zero (0). After the badge value is increased by one (1), the badge value becomes one (1). If an application originally had a non-zero badge value, that value is increased by one (1). For example, for an application already having a badge value of three (3), after increasing the badge value, it becomes four (4).

Figure 2E:
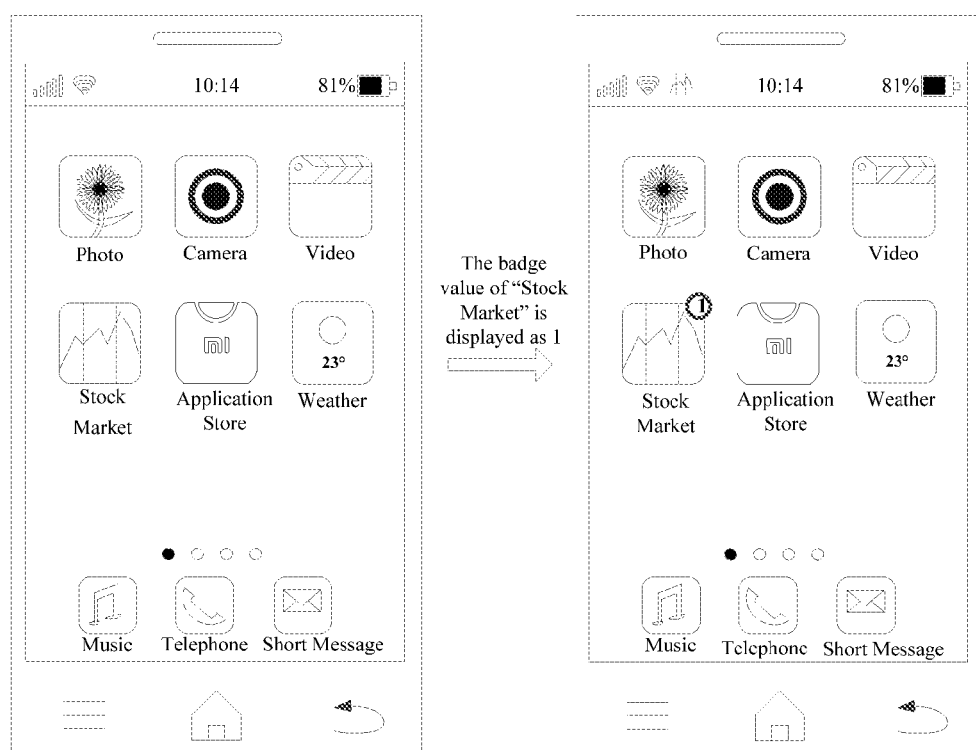
FIG. 2E is a schematic diagram showing an increased badge value being displayed on an icon of an application according to an exemplary embodiment.

At 205, an icon of the application is updated to display the increased badge value. If no badge value is displayed on the icon, the increased badge value is directly added onto the icon of the application. FIG. 2E is a schematic diagram showing an increased badge value being displayed on an icon of an application according to an exemplary embodiment. As shown in FIG. 2E, the icon of the application, Stock Market, originally had no badge value. When an increased badge value, i.e., one (1), is obtained by calculation, this badge value is displayed on the icon of the application Stock Market.

Figure 2F:
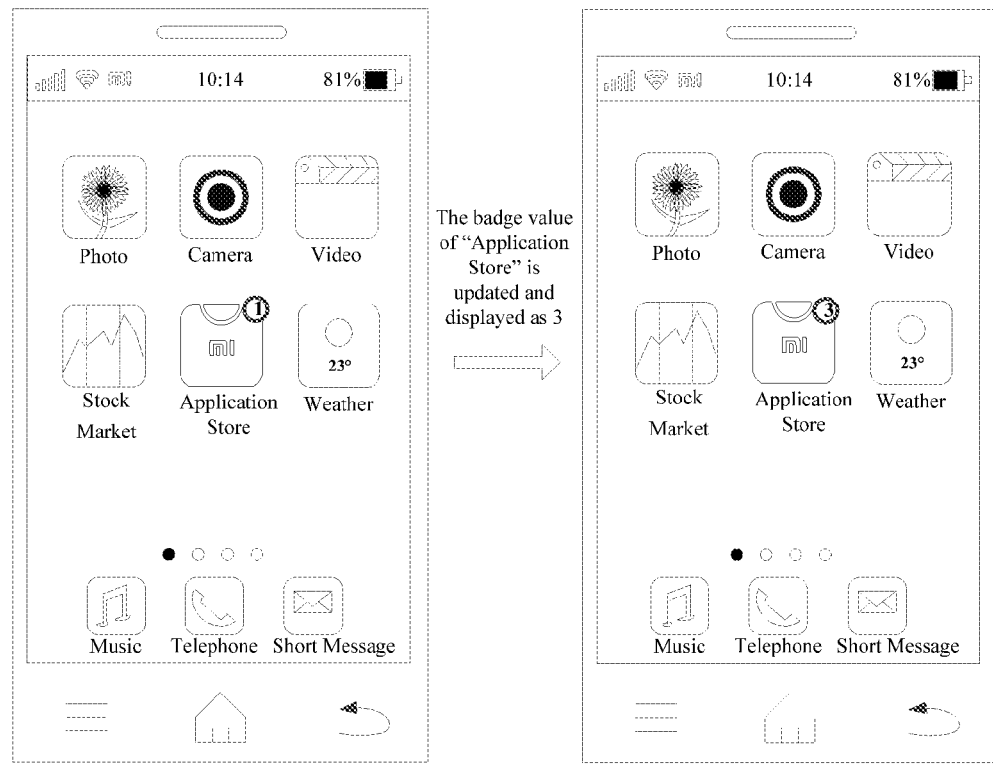
FIG. 2F is a schematic diagram showing an increased badge value being displayed on an icon of an application according to another exemplary embodiment.

On the other hand, if a badge value is already displayed on the icon, the icon is updated to display the increased badge value. FIG. 2F is a schematic diagram showing an increased badge value being displayed on an icon of an application according to another exemplary embodiment. As shown in FIG. 2F, the icon of the application, Application Store, originally had a badge value one (1). When an increased badge value three (3) is obtained by calculation, the icon of the application, Application Store, is updated to display the increased badge value three (3).

According to the present disclosure, the badge value can be displayed in any form of number, such as an Arabic number or a Chinese number, and can be in any shape, such as a circle or a rectangle.

In some embodiments, the badge value of an application may be reduced when the user reads unread messages of the application. Referring again to FIG. 2A, at 206, when a notification message is deleted from the notification bar, it is detected whether unread messages corresponding to the notification message have been read. In some embodiments, if an unread message of an unspecific application has been read by the user, the notification message corresponding to the unread message is deleted from the notification bar. In some embodiments, if an unread message of an unspecific application has been read by a user, the notification message corresponding to the unread message may also be deleted from the notification bar. However, if the notification message corresponds to at least two unread messages and the user has only read one of the unread messages, the notification message may possibly also be deleted. In some embodiments, when the user clicks on or selects a certain notification message in the notification bar, the notification message is deleted from the notification bar.

Therefore, when a notification message is deleted from the notification bar, in order to update the badge value of the application corresponding to the notification message, it is needed to detect whether the unread message corresponding to the application has been read.

At 207, if it is detected that the unread messages corresponding to the notification message have been read, the number of unread messages is subtracted from the badge value of the application corresponding to the notification message to obtain a reduced badge value, and the icon of the application is updated to display the reduced badge value.

If the notification message corresponds to an unspecific application and it is detected that the unread message corresponding to the notification message has been read, then the number of unread message, i.e., one, is subtracted from the badge value of the application to obtain the reduced badge value. The icon of the application is updated to display the reduced badge value. That is, when the notification message of the unspecific application is deleted and it is detected that the unread message of the unspecific application has been read, the badge value of the unspecific application is directly reduced by one (1) and then displayed.

Figure 2G:
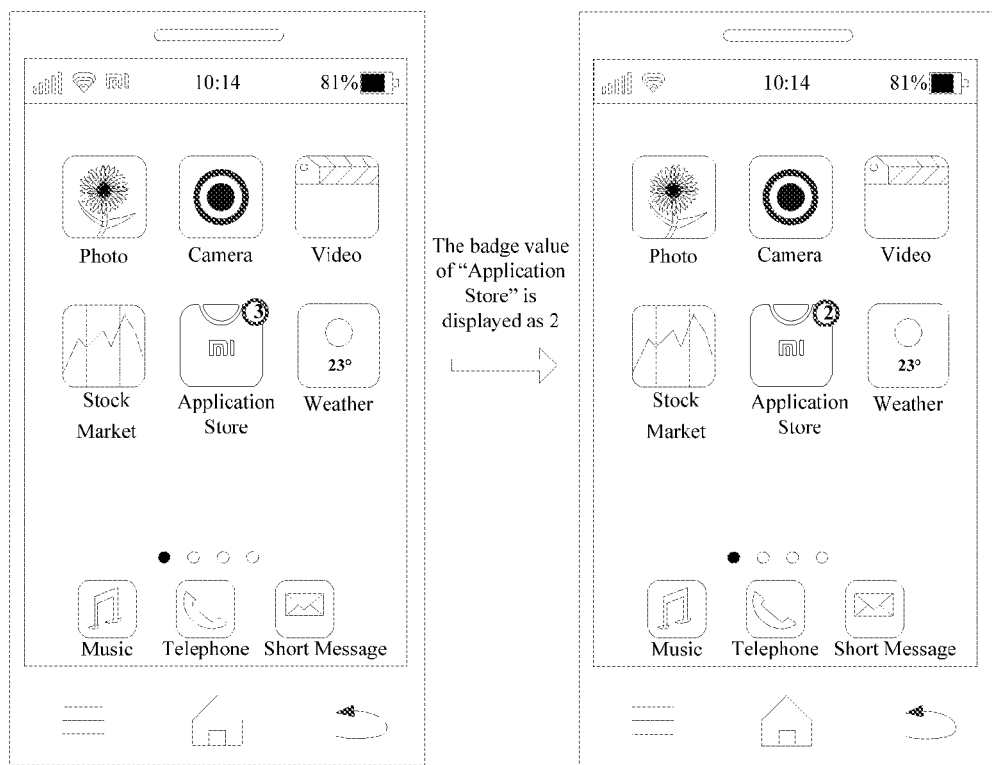
FIG. 2G is a schematic diagram showing subtracting the number of read messages from the badge value of an application according to an exemplary embodiment.

In some embodiments, when the original badge value of the unspecific application is greater than one (1), after one (1) is subtracted from the badge value, the badge value is updated and continues to be displayed on the icon of the unspecific application. FIG. 2G is a schematic diagram showing that the badge value of an application is reduced by the number of read messages according to an exemplary embodiment. As shown in FIG. 2G, the icon of the application, Application Store, originally had a badge value three (3), which is reduced by one (1) to obtain a reduced badge value two (2). The reduced badge value two (2) is displayed on the icon of the application, Application Store.

Figure 2H:
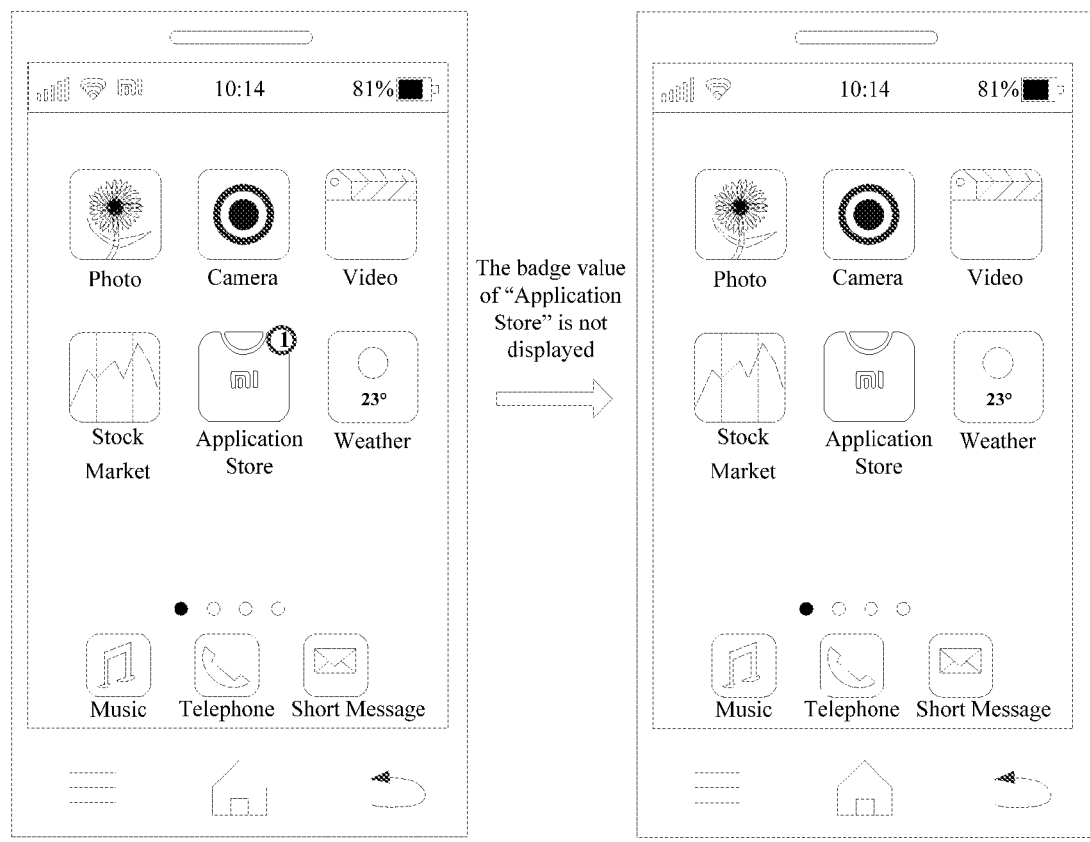
FIG. 2H is a schematic diagram showing subtracting the number of read messages from the badge value of an application according to another exemplary embodiment.

In some embodiments, when the original badge value of the unspecific application equals one (1), after one (1) is subtracted from the badge value, no badge value is displayed on the icon of the unspecific application. FIG. 2H is a schematic diagram showing that the badge value of an application is reduced by the number of read messages according to an exemplary embodiment. As shown in FIG. 2H, the icon of the application, Application Store, originally had a badge value one (1), which is reduced by one (1) to obtain a reduced badge value zero (0), which means that the application, Application Store, now has no unread message. Therefore, no badge value is displayed on the icon of the application, Application Store.

Figure 3A:
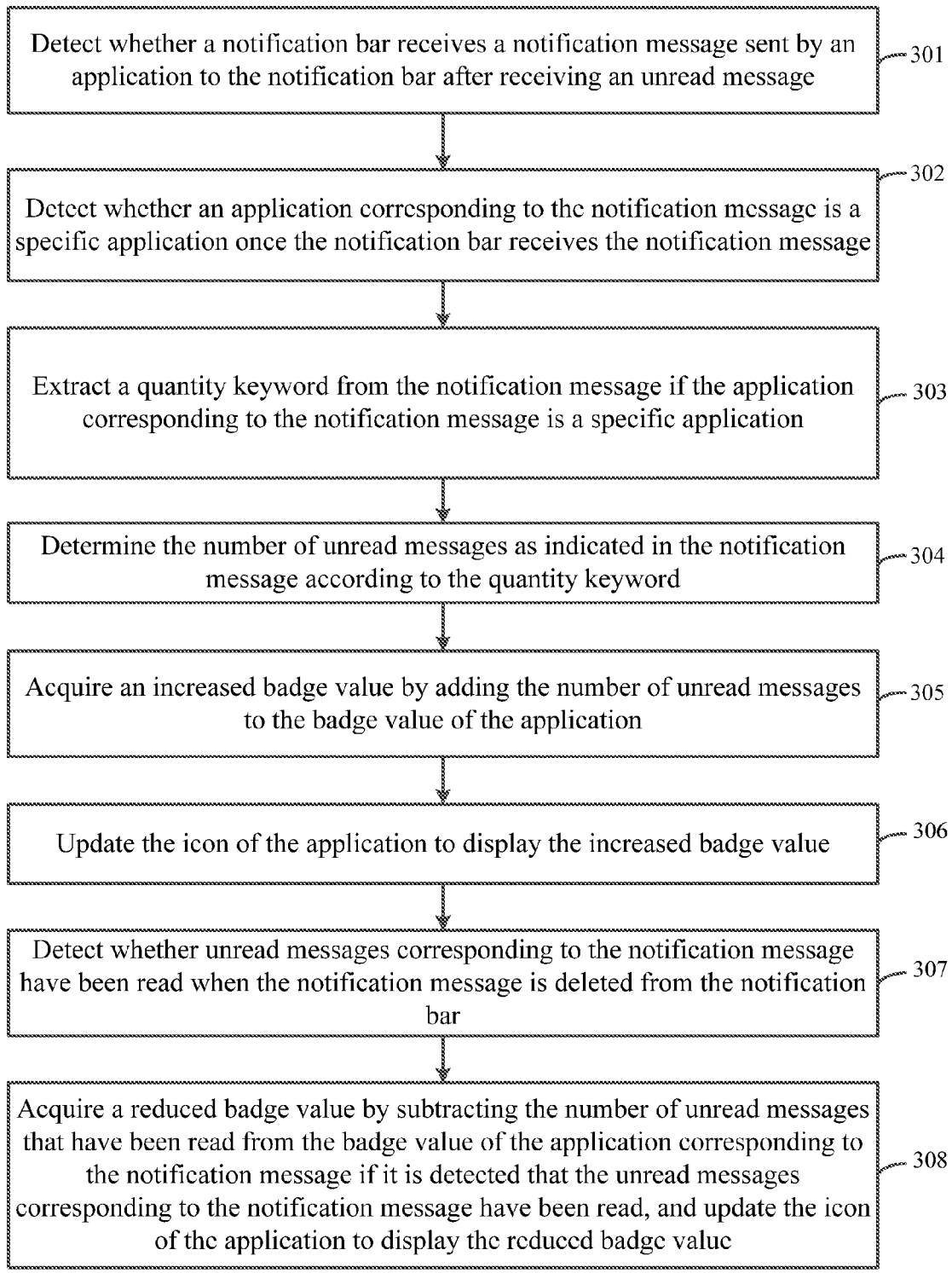
FIG. 3A is a flow chart showing a method for adding an application badge according to a further exemplary embodiment.

FIG. 3A is a flow chart showing an exemplary method for adding an application badge consistent with embodiments of the disclosure. As shown in FIG. 3A, at 301, whether a notification bar receives a notification message is detected. The notification message is sent by an application to the notification bar after receiving an unread message. The application may be a system application originally installed in the electronic device, or a non-system application installed by users. The process at 301 in FIG. 3A is similar to that at 201 in FIG. 2A, and thus detailed descriptions of 301 are omitted here.

At 302, whether an application corresponding to the notification message is a specific application is detected once the notification bar receives the notification message. In some embodiments, the notification message carries an application identifier, and thus the application from which the notification message is sent can be determined according to the application identifier in the notification message. The process at 302 in FIG. 3A is similar to that at 202 in FIG. 2A, and thus detailed descriptions of 302 are omitted here.

At 303, if the application corresponding to the notification message is a specific application, a quantity keyword is extracted from the notification message. The quantity keyword indicates the number of unread messages received by the application.

At 304, the number of unread messages as indicated by the notification message is determined according to the quantity keyword. In some embodiments, the notification message generated by the specific application has a specific code segment for indicating unread messages. The quantity keyword can be acquired by analyzing the specific code segment. For example, the specific code segment may be "message (count=6)," which means the number of unread messages received by the application as indicated by the quantity keyword is six (6). In some embodiments, the quantity keyword can also be acquired by other approaches, detailed descriptions of which are omitted here.

At 305, an increased badge value is acquired by adding the number of unread messages indicated by the quantity keyword to the badge value of the application. If an application originally did not have unread messages, by default the application had a badge value zero (0). That badge value is increased by the number of unread messages to obtain the increased badge value. For example, if the application originally did not have a badge value and the number of unread messages is two (2), then the increased badge value is two (2). If the application originally had a non-zero badge value, that badge value is increased by the number of unread messages to obtain the increased badge value. For example, if the original badge value of the application is three (3) and the number of unread messages is two (2), then the increased badge value is five (5).

Figure 3B:
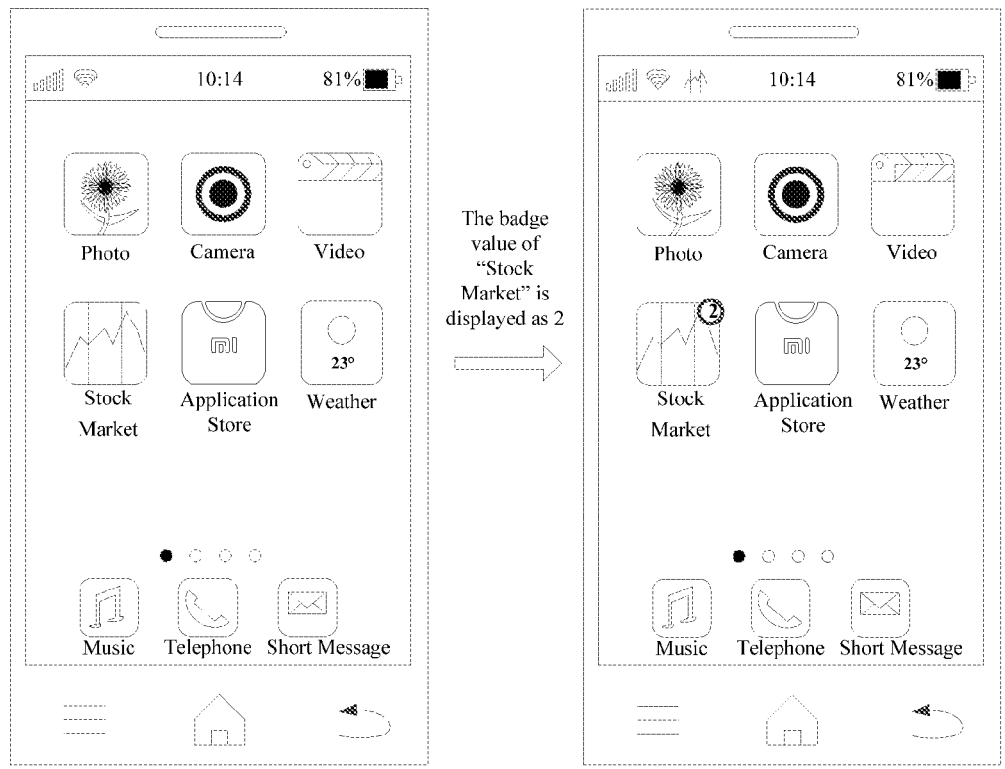
FIG. 3B is a schematic diagram showing adding the number of unread messages to the badge value of an application according to an exemplary embodiment.

At 306, an icon of the application is updated to display the increased badge value. If no badge value is displayed on the icon, the increased badge value is directly added onto the icon of the application. FIG. 3B is a schematic diagram showing an increased badge value being displayed on an icon of an application according to an exemplary embodiment. As shown in FIG. 3B, the icon of the application, Stock Market, originally had no badge value. When a notification message is later received that shows a number of unread messages of two (2), a badge value two (2) is displayed on the icon of the application, Stock Market.

Figure 3C:
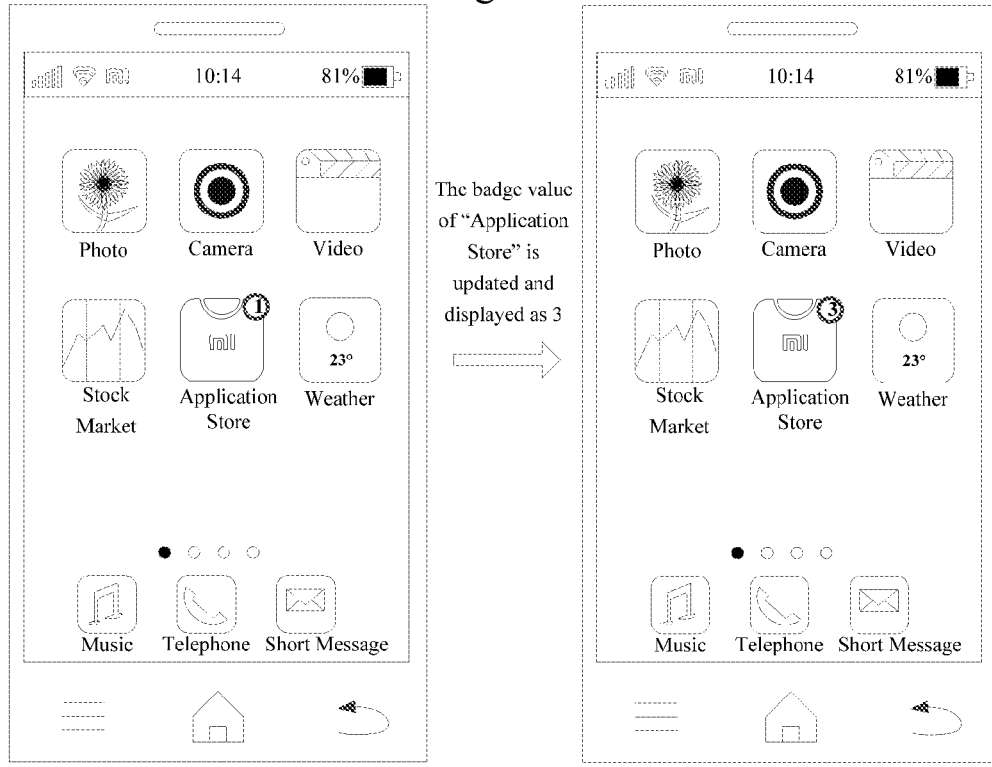
FIG. 3C is a schematic diagram showing adding the number of unread messages to the badge value of an application according to another exemplary embodiment.

On the other hand, if a badge value is already displayed on the icon, the icon is updated to display the increased badge value. FIG. 3C is a schematic diagram showing an increased badge value being displayed on an icon of an application according to another exemplary embodiment. As shown in FIG. 3C, the icon of the application, Application Store, originally had a badge value one (1). When a notification message is later received that shows a number of unread messages of two (2), the badge value of the icon of the application, Application Store, is increased by two (2) to obtain an increased badge value three (3). The icon of the application is updated to display the increased badge value three (3).

In some embodiments, the badge value of an application may be reduced when the user reads unread messages of the application. Referring again to FIG. 3A, at 307, when a notification message is deleted from the notification bar, it is detected whether unread messages corresponding to the notification message have been read. The process at 307 in FIG. 3A is similar to that at 206 in FIG. 2A, and thus detailed descriptions of 307 are omitted here.

At 308, if it is detected that the unread messages corresponding to the notification message have been read, the number of unread messages is subtracted from the badge value of the application corresponding to the notification message to obtain a reduced badge value, and the icon of the application is updated to display the reduced badge value.

If the notification message corresponds to a specific application and it is detected that at least one unread message corresponding to the notification message has been read, then the number of unread messages is subtracted from the badge value of the application to obtain the reduced badge value. The icon of the application is updated to display the reduced badge value. That is, when the notification message of the specific application is deleted and it is detected that several unread messages of the specific application have been read, the badge value of the specific application is reduced by the number of unread messages that have been read and is then displayed.

Figure 3D:
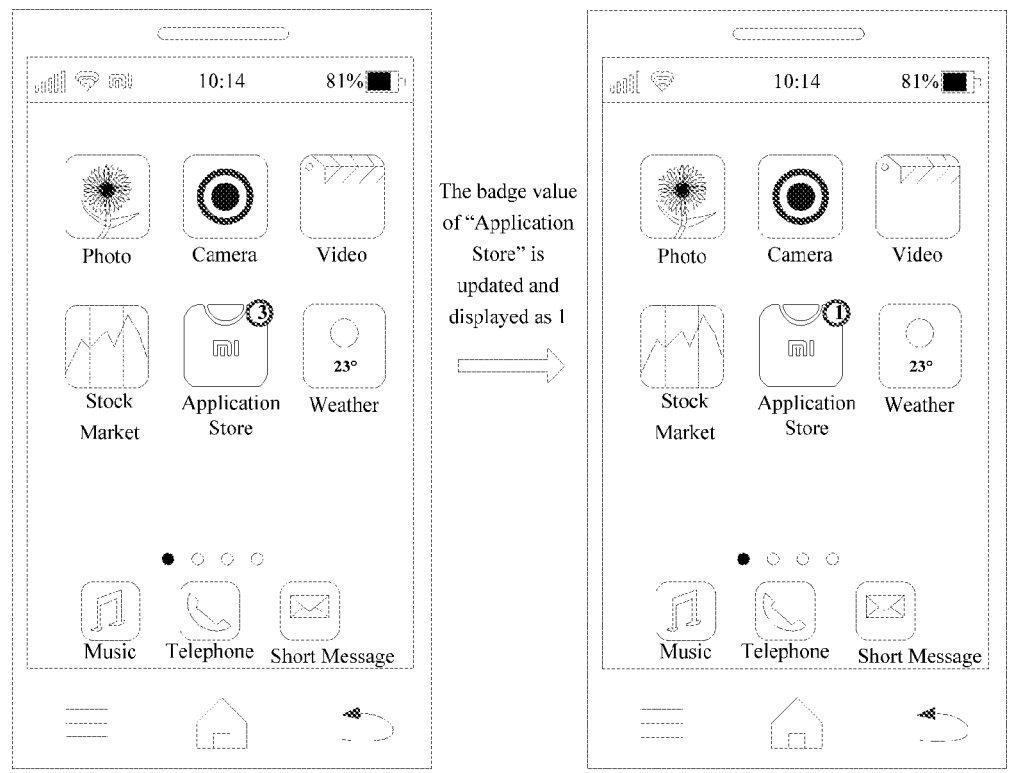
FIG. 3D is a schematic diagram showing subtracting the number of read messages from the badge value of an application according to an exemplary embodiment.

In some embodiments, when the original badge value of the unspecific application is greater than the number of unread messages that have been read, after the number of unread messages that have been read is subtracted from the badge value, the badge value is updated and continues to be displayed on the icon of the specific application. FIG. 3D is a schematic diagram showing that the badge value of an application is reduced by the number of read messages according to an exemplary embodiment. As shown in FIG. 3D, the icon of the application, Application Store, originally had a badge value three (3). After two of the unread messages have been read, the badge value is reduced by two (2) to obtain a reduced badge value one (1). The icon of the application, Application Store, is updated to display the reduced badge value one (1).

Figure 3E:
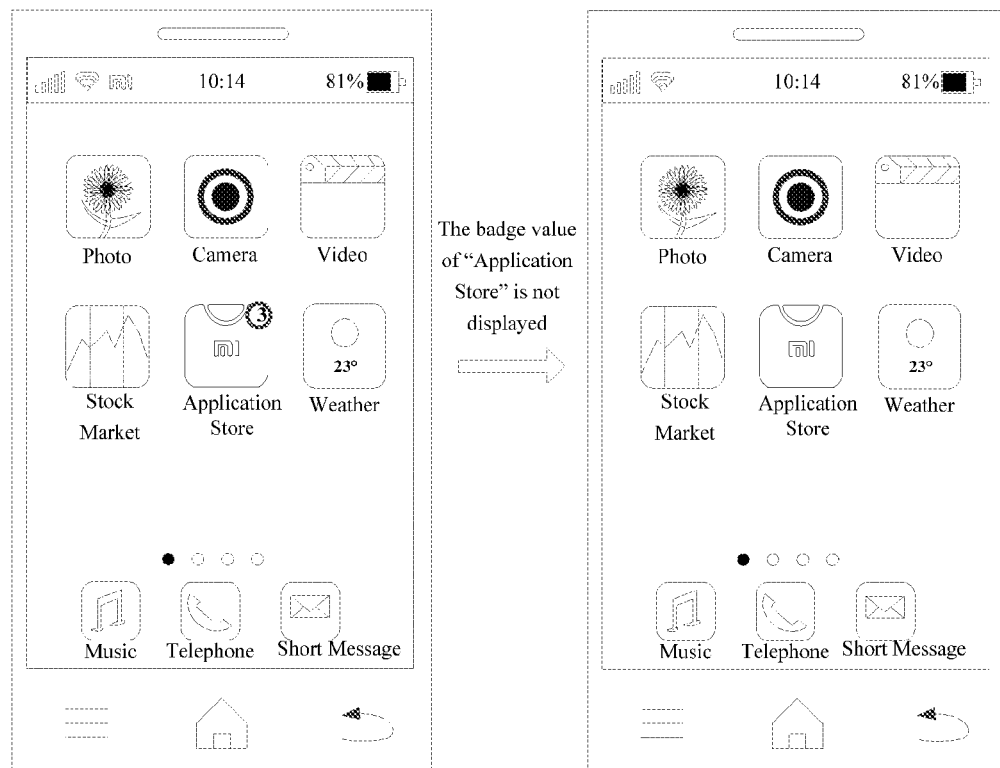
FIG. 3E is a schematic diagram showing subtracting the number of read messages from the badge value of an application icon according to another exemplary embodiment.

In some embodiments, when the original badge value of the specific application equals the number of unread messages that have been read, after the number of unread messages that have been read is subtracted from the badge value, no badge value is displayed on the icon of the specific application. That is, in this scenario, after the number of unread messages that have been read is subtracted from the badge value, the obtained reduced badge value is zero (0), then the icon of the application no longer displays the badge value. FIG. 3E is a schematic diagram showing that the badge value of an application is reduced by the number of read messages according to an exemplary embodiment. As shown in FIG. 3E, the icon of the application, Application Store, originally had a badge value of three (3). After the three unread messages have been read, the reduced badge value is zero (0), and thus no badge value is displayed on the icon of the application, Application Store.

Embodiments of devices consistent with the present disclosure will be described below. The devices are configured to carry out methods consistent with the present disclosure, and may be, for example, a smart mobile phone, a tablet computer, a smart television, an e-book reader, a laptop computer, a desktop computer or the like. Details of the devices can be found in the above descriptions of methods consistent with the present disclosure.

Figures 4, 5:
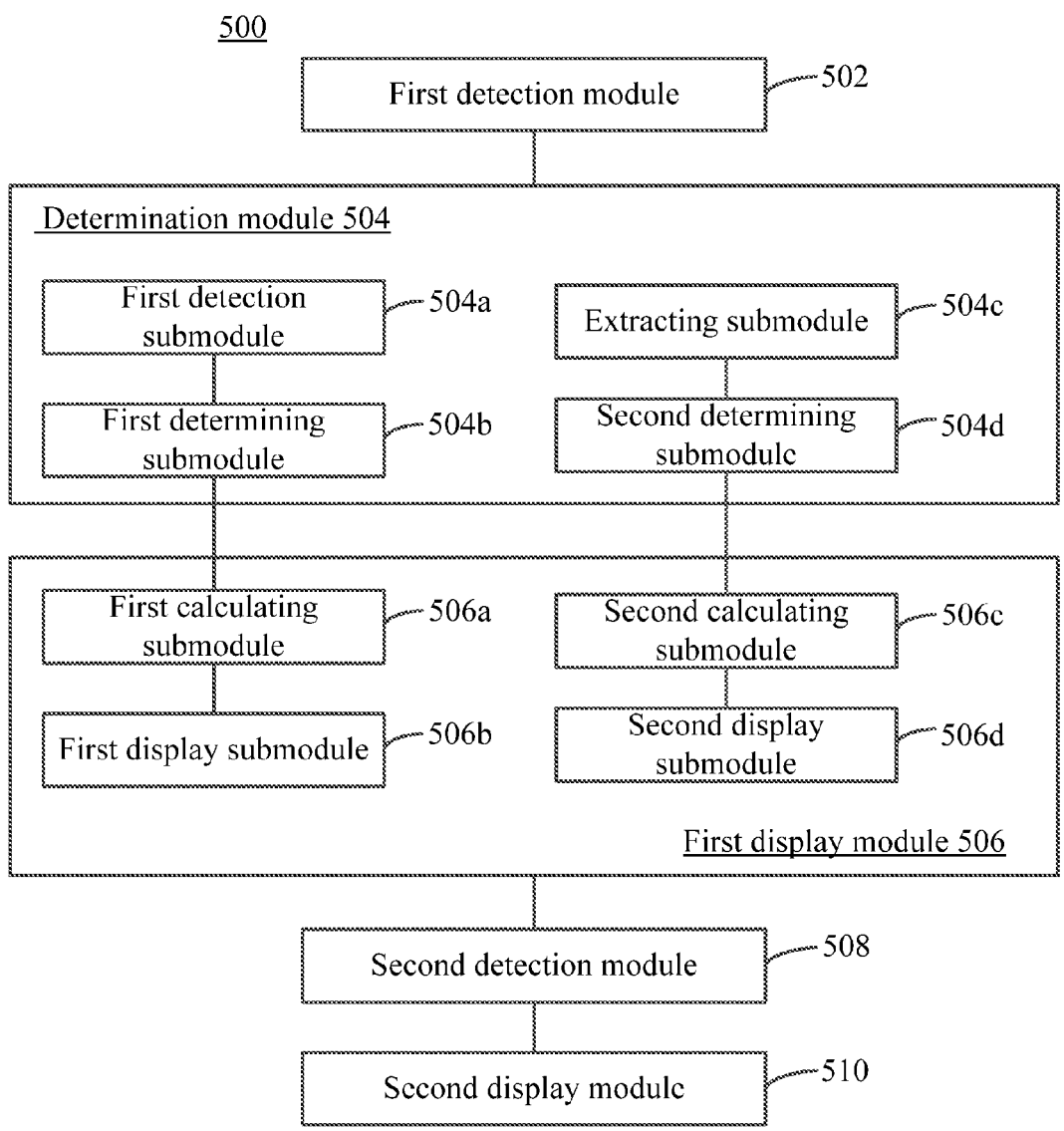
FIG. 4 is a block diagram of a device for adding an application badge according to an exemplary embodiment.
FIG. 5 is a block diagram of a device for adding an application badge according to another exemplary embodiment.

FIG. 4 is a block diagram showing an exemplary device 400 for adding an application badge consistent with embodiments of the present disclosure. As shown in FIG. 4, the device 400 includes a first detection module 402, a determination module 404, and a first display module 406. The first detection module 402 is configured to detect whether a notification bar receives a notification message sent by an application after receiving an unread message. The determination module 404 is configured to determine, once the first detection module 402 detects that the notification bar has received a notification message, the number of unread messages received by the application corresponding to the notification message according to the notification message. The first display module 406 is configured to update an icon of the application to display a badge value according to the number of unread messages determined by the determination module 404.

FIG. 5 is a block diagram showing another exemplary device 500 for adding an application badge consistent with embodiments of the present disclosure. As shown in FIG. 5, the device 500 includes a first detection module 502, a determination module 504, and a first display module 506. The first detection module 502 is configured to detect whether a notification bar receives a notification message sent by an application after receiving an unread message. The determination module 504 is configured to determine, once the first detection module 502 detects that the notification bar has received a notification message, the number of unread messages received by the application corresponding to the notification message according to the notification message. The first display module 506 is configured to update an icon of the application to display a badge value according to the number of unread messages determined by the determination module 504.

As shown in FIG. 5, the determining module 504 includes a first detection submodule 504*a* and a first determining submodule 504*b*. The first detection submodule 504*a* is configured to detect whether an application corresponding to the notification message is a specific application. A notification message sent by the specific application to the notification bar is generated by the specific application by using unread messages received within a statistical time range and sent to the notification bar. The first determining submodule 504*b* is configured to determine the number of unread messages as one (1) according to the notification message if the first detection submodule 504*a* detects that the application corresponding to the notification message is not a specific application.

As shown in FIG. 5, the first display module 506 includes a first calculating submodule 506*a* and a first display submodule 506*b*. The first calculating submodule 506*a* is configured to acquire an increased badge value by adding one (1) to a badge value of the application. The first display submodule 506*b* is configured to update an icon of the application icon to display the increased badge value.

In some embodiments, as shown in FIG. 5, the determination module 504 further includes an extracting submodule 504*c* and a second determining submodule 504*d*. The extracting submodule 504*c* is configured to extract a quantity keyword from the notification message if the first detection submodule 504*a* detects that the application corresponding to the notification message is a specific application. The quantity keyword indicates the number of unread messages received by the application. The second determining submodule 504*d* is configured to determine the number of unread messages as indicated in the notification message according to the quantity keyword.

In some embodiments, as shown in FIG. 5, the first display module 506 further includes a second calculating submodule 506*c* and a second display submodule 506*d*. The second calculating submodule 506*c* is configured to acquire an increased badge value by adding the number of unread messages to the badge value of the application. The second display submodule 506*d* is configured to update the icon of the application to display the increased badge value.

In some embodiments, as shown in FIG. 5, the device 500 further includes a second detection module 508 and a second display module 510. The second detection module 508 is configured to detect whether unread messages corresponding to the notification message have been read when the notification message is deleted from the notification bar. The second display module 510 is configured to acquire a reduced badge value by subtracting the number of unread messages that have been read from the badge value of the application corresponding to the notification message if the second detection module 508 detects that unread messages corresponding to the notification message have been read, and update the icon of the application to display the reduced badge value.

A device consistent with embodiments of the present disclosure may include a processor and a non-transitory computer-readable storage medium, such as a memory, storing instructions that, when executed by the processor, cause the device to perform methods consistent with embodiments of the present disclosure.

Figure 6:
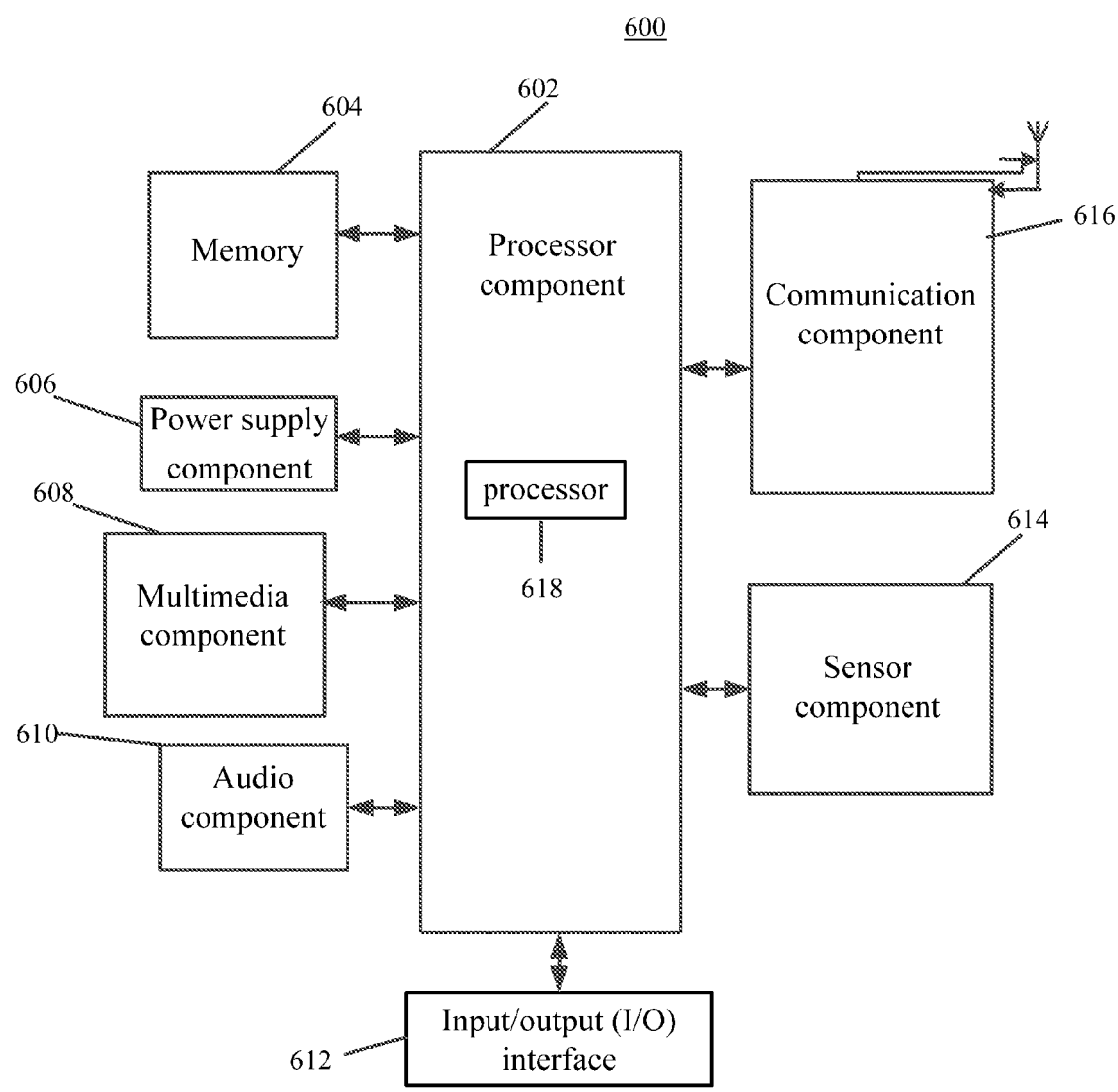
FIG. 6 is a block diagram of a device for adding an application badge according to a further exemplary embodiment.

FIG. 6 is a block diagram of an exemplary device 600 for adding an application badge consistent with embodiments of the present disclosure. The device 600 may be, for example, a mobile telephone, a computer, a digital broadcasting terminal, a message transceiver device, a games console, a tablet device, a medical device, a fitness facility, a personal digital assistant (PDA), or the like.

Referring to FIG. 6, the device 600 includes one or more of a processor component 602, a memory 604, a power supply component 606, a multimedia component 608, an audio component 610, an input/output (I/O) interface 612, a sensor component 614, and a communication component 616.

The processor component 602 usually controls the overall operation of the device 600, for example, display, telephone call, data communication, and operation associated with camera operation and record operation. The processor component 602 may include one or more processors 618 for executing instructions so as to perform all or part of the above methods. In addition, the processor component 602 may include one or a plurality of modules for the convenience of interaction between the processor component 602 and other components. For example, the processor component 602 may include a multimedia module for the convenience of interaction between the multimedia component 608 and the processor component 602.

The memory 604 is configured to store data of different types so as to support the operation of the device 600. Examples of the data include any application program or approach directive for operation of the device 600, including contact data, phonebook data, message, picture and video, etc. The memory 604 may be realized by volatile or non-volatile memory device of any type or combination thereof, for example, static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

The power supply component 606 provides power for components of the device 600. The power supply component 606 may include a power management system, one or a plurality of power supplies, and other components associated with power generation, management and distribution of the device 600.

The multimedia component 608 includes a screen provided between the device 600 and a user for providing an output interface. In some embodiments, the screen may include an LCD (Liquid Crystal Display) and a touch panel (TP). If the screen includes a touch panel, the screen may be realized as a touch screen for receiving input signal from users. The touch panel includes one or a plurality of touch sensors for sensing gestures on the touch panel, for example, touching and sliding, etc. The touch sensor not only can sensor trip boundary of touching or sliding, but also can detect the duration and pressure related to the touching or sliding operation. In some embodiments, the multimedia component 608 includes a front-facing camera and/or a rear-facing camera. When the device 600 is under an operation mode, for example, capture mode or video mode, the front-facing camera and/or the rear-facing camera may receive external multimedia data. Each front-facing camera and rear-facing camera may be a fixed optical lens system or have focal length and optical zoom capacity.

The audio component 610 is configured to output and/or input audio signal. For example, the audio component 610 includes a microphone (MIC), configured to receive external audio signal when the device 600 is under an operation mode such as a call mode, a record mode, or a speech recognition mode. The audio signal received may be further stored in the memory 604 or sent out by the communication component 616. In some embodiments, the audio component 610 also includes a loudspeaker for outputting audio signal.

The I/O interface 612 provides interface for the processor component 602 and peripheral interface modules, the peripheral interface modules may be a keyboard, a click wheel and buttons, etc. These buttons may include but not limited to: home button, volume button, start button and locking button.

The sensor component 614 includes one or more sensors for providing the device 600 with state evaluation from various aspects. For example, the sensor component 614 may detect the on/off state of the device 600, relative positioning of components, for example, the display and keypad, of the device 600. The sensor component 614 may also detect the position change of the device 600 or a component thereof, the presence or absence of a user's touch on the device 600, the direction or acceleration/deceleration of the device 600, and temperature variation of the device 600. The sensor component 614 may also include a proximity detector, which is configured to detect the presence of nearby objects in case of no physical touch. The sensor component 614 may also include an optical sensor, for example, CMOS or CCD image sensor, for imaging. In some embodiments, the sensor component 614 may also include an acceleration sensor, a gyro sensor, a magnetic sensor, a pressure sensor, or a temperature sensor.

The communication component 616 is configured to facilitate wired communication or wireless communication between the device 600 and other equipment. The device 600 is available for access to wireless network based on communication standards, for example, WiFi, 2G or 3G, or combination thereof. In an exemplary embodiment, the communication component 616 receives by means of a broadcast channel the broadcast signal or broadcast-related information from external broadcast management systems. In an exemplary embodiment, the communication component 616 also includes a near field communication (NFC) module for promoting short-range communication. For example, the NFC module may be realized on the basis of Radio Frequency Identification (RFID) Technology, Infrared Data Association (IrDA) Technology, Ultra-wide Bandwidth (UWB) Technology, Bluetooth (BT) Technology and other technologies.

In exemplary embodiments, the device 600 may be realized by one or a plurality of application specific integrated circuits (ASIC), digital signal processors (DSP), digital signal processing equipment (DSPD), programmable logic devices (PLD), field programmable gate arrays (FPGA), controllers, microcontrollers, microprocessors or other electronic components, configured to execute the above methods.

In exemplary embodiments, a non-transitory computer-readable storage medium including instructions is also provided, for example, a memory 604 storing instructions, which may be executed by the processors 618 of the device 600 so as to perform the above methods. For example, the non-transitory computer-readable storage medium may be a ROM, a random access memory (RAM), a CD-ROM, a magnetic tape, a floppy disk, or an optical data storage device, etc.

According to the present disclosure, badges can be added to icons of both non-system applications and system applications, rather than just the system applications.

Other embodiments of the present disclosure will be apparent to those skilled in the art from consideration of the description herein. The present disclosure is intended to cover any variations, uses, or adaptations of the invention following the general principles thereof and including such departures from the present disclosure within known or customary practice in the art. It is intended that the specification and examples be considered as exemplary only, with a true scope and spirit of the invention being indicated by the following claims.

It should be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for adding an application badge, comprising:
   detecting whether a notification bar receives a notification message, the notification message being sent by an application to the notification bar after receiving an unread message;
   determining, if the notification bar receives a notification message, a number of unread messages received by the application according to the notification message, including:
     detecting whether the application is a specific application that accumulates unread messages received within a statistical time range before sending a notification message to the notification bar;
     determining the number of unread messages as 1 according to the notification message if the application is not a specific application;
     extracting a quantity keyword from the notification message if the application is a specific application, the quantity keyword indicating the number of unread messages received by the application; and
     determining the number of unread messages as indicated in the notification message according to the quantity keyword; and
   updating an icon of the application to display a badge value according to the number of unread messages.

2. The method of claim 1, wherein updating the icon of the application to display the badge value includes:
   acquiring an increased badge value by adding 1 to an original badge value of the application; and updating the icon of the application to display the increased badge value.

3. The method according to claim 2, further comprising:
detecting whether one or more unread messages corresponding to the notification message have been read when the notification message is deleted from the notification bar;
acquiring a reduced badge value by subtracting the number of unread messages that have been read from the badge value of the application if the one or more unread messages have been read; and
updating the icon of the application to display the reduced badge value.

4. The method of claim 1, wherein updating the icon of the application to display the badge value includes:
acquiring an increased badge value by adding the number of unread messages to an original badge value of the application; and
updating the icon of the application to display the increased badge value.

5. The method according to claim 1, further comprising:
detecting whether one or more unread messages corresponding to the notification message have been read when the notification message is deleted from the notification bar;
acquiring a reduced badge value by subtracting the number of unread messages that have been read from the badge value of the application if the one or more unread messages have been read; and
updating the icon of the application to display the reduced badge value.

6. A device for adding an application badge, comprising:
a processor; and
a non-transitory computer-readable storage medium storing instructions that, when executed by the processor, cause the processor to:
detect whether a notification bar receives a notification message, the notification message being sent by an application to the notification bar after receiving an unread message;
determine, if the notification bar receives a notification message, a number of unread messages received by the application according to the notification message, including:
detecting whether the application is a specific application that accumulates unread messages received within a statistical time range before sending a notification message to the notification bar;
determining the number of unread messages as 1 according to the notification message if the application is not a specific application;
extracting a quantity keyword from the notification message if the application is a specific application, the quantity keyword indicating the number of unread messages received by the application; and
determining the number of unread messages as indicated in the notification message according to the quantity keyword; and
update an icon of the application to display a badge value according to the number of unread messages.

7. The device of claim 6, wherein the instructions further cause the processor to:
acquire an increased badge value by adding 1 to an original badge value of the application; and
update the icon of the application to display the increased badge value.

8. The device according to claim 7, wherein the instructions further cause the processor to:
detect whether one or more unread messages corresponding to the notification message have been read when the notification message is deleted from the notification bar;
acquire a reduced badge value by subtracting the number of unread messages that have been read from the badge value of the application if the one or more unread messages have been read; and
update the icon of the application to display the reduced badge value.

9. The device of 6, wherein the instructions further cause the processor to:
acquire an increased badge value by adding the number of unread messages to an original badge value of the application; and
update the icon of the application to display the increased badge value.

10. The device according to claim 6, wherein the instructions further cause the processor to:
detect whether one or more unread messages corresponding to the notification message have been read when the notification message is deleted from the notification bar;
acquire a reduced badge value by subtracting the number of unread messages that have been read from the badge value of the application if the one or more unread messages have been read; and
update the icon of the application to display the reduced badge value.

11. A non-transitory computer-readable storage medium having stored therein instructions that, when executed by a processor of an electronic device, cause the electronic device to:
detect whether a notification bar receives a notification message, the notification message being sent by an application to the notification bar after receiving an unread message;
determine, if the notification bar receives a notification message, a number of unread messages received by the application according to the notification message, including:
detecting whether the application is a specific application that accumulates unread messages received within a statistical time range before sending a notification message to the notification bar;
determining the number of unread messages as 1 according to the notification message if the application is not a specific application;
extracting a quantity keyword from the notification message if the application is a specific application, the quantity keyword indicating the number of unread messages received by the application; and
determining the number of unread messages as indicated in the notification message according to the quantity keyword; and
update an icon of the application to display a badge value according to the number of unread messages.

12. The medium of claim 11, wherein the instructions further cause the electronic device to:
acquire an increased badge value by adding 1 to an original badge value of the application; and
update the icon of the application to display the increased badge value.

* * * * *